US010426990B2

(12) United States Patent
Hockridge et al.

(10) Patent No.: US 10,426,990 B2
(45) Date of Patent: Oct. 1, 2019

(54) CONVERTIBLE BENCH AND UPRIGHT STABILIZING SUPPORT

(71) Applicant: HOIST FITNESS SYSTEMS, INC., Poway, CA (US)

(72) Inventors: Bruce Hockridge, San Diego, CA (US); Grzegorz Lyszczarz, London (CA)

(73) Assignee: HOIST FITNESS SYSTEMS, INC., Poway, CA (US)

( * ) Notice: Subject to any disclaimer, the term of this patent is extended or adjusted under 35 U.S.C. 154(b) by 0 days.

(21) Appl. No.: 15/952,835

(22) Filed: Apr. 13, 2018

(65) Prior Publication Data

US 2018/0229069 A1 Aug. 16, 2018

Related U.S. Application Data

(63) Continuation of application No. 15/248,938, filed on Aug. 26, 2016, now Pat. No. 10,010,740.

(Continued)

(51) Int. Cl.
*A63B 21/00* (2006.01)
*A63B 21/062* (2006.01)
*A63B 23/02* (2006.01)
*A63B 23/12* (2006.01)

(Continued)

(52) U.S. Cl.
CPC ........ *A63B 21/0628* (2015.10); *A63B 21/156* (2013.01); *A63B 21/4033* (2015.10);

(Continued)

(58) Field of Classification Search
CPC ............ A63B 21/0615; A63B 21/4029; A63B 21/0442; A63B 21/078; A63B 21/4031; A63B 21/062–0632
See application file for complete search history.

(56) References Cited

U.S. PATENT DOCUMENTS 4,653,751 A * 3/1987 Green ................ A63B 21/4029
482/104
5,370,595 A * 12/1994 Voris .................. A63B 21/4031
482/100

(Continued)

FOREIGN PATENT DOCUMENTS

GB 2352643 A 2/2001

OTHER PUBLICATIONS

International Searching Authority, International Search Report and Written Opinion for International Application No. PCT/US2016/048879, dated Dec. 1, 2016, 10 pages.

(Continued)

*Primary Examiner* — Nyca T Nguyen
*Assistant Examiner* — Rae Fischer
(74) *Attorney, Agent, or Firm* — Gordon Rees Scully Mansukhani LLP; David R. Heckadon

(57) ABSTRACT

An exercise machine for performing a variety of different exercise routines includes a rotating arm assembly and a swing-away workout station. The workout stations may include a bench seat and a stabilizing support, and may be adjusted to provide for a number of different configurations. For example, the bench seat and the stabilizing support may pivot forward and backward, and the stabilizing support may extend upward and downward for supporting the user's body in different positions, while performing different exercise routines.

13 Claims, 13 Drawing Sheets

Related U.S. Application Data

(60) Provisional application No. 62/211,346, filed on Aug. 28, 2015.

(51) Int. Cl.
| | |
|---|---|
| *F16B 7/10* | (2006.01) |
| *A63B 23/035* | (2006.01) |
| *A63B 69/00* | (2006.01) |
| *A63B 1/00* | (2006.01) |
| *A63B 23/04* | (2006.01) |
| *A63B 21/002* | (2006.01) |

(52) U.S. Cl.
CPC ............ *A63B 21/4047* (2015.10); *F16B 7/10* (2013.01); *A63B 1/00* (2013.01); *A63B 21/0023* (2013.01); *A63B 21/151* (2013.01); *A63B 21/4035* (2015.10); *A63B 21/4043* (2015.10); *A63B 21/4049* (2015.10); *A63B 23/0216* (2013.01); *A63B 23/0227* (2013.01); *A63B 23/0233* (2013.01); *A63B 23/03541* (2013.01); *A63B 23/03558* (2013.01); *A63B 23/0405* (2013.01); *A63B 23/1209* (2013.01); *A63B 23/1218* (2013.01); *A63B 23/1227* (2013.01); *A63B 69/0057* (2013.01); *A63B 2208/0204* (2013.01); *A63B 2208/0233* (2013.01); *A63B 2210/50* (2013.01); *A63B 2225/09* (2013.01); *A63B 2225/682* (2013.01); *A63B 2225/685* (2013.01)

(56) References Cited

U.S. PATENT DOCUMENTS

| | | | |
|---|---|---|---|
| 5,788,614 A | 8/1998 | Simonson | |
| 6,287,243 B1 | 9/2001 | Isom et al. | |
| 6,302,833 B1* | 10/2001 | Ellis | A63B 21/078 482/100 |
| 7,575,538 B1* | 8/2009 | Clark | A63B 21/154 482/103 |
| 7,717,836 B1 | 5/2010 | Miller et al. | |
| 7,922,630 B1* | 4/2011 | Batca | A63B 21/0628 482/100 |
| 8,057,368 B1* | 11/2011 | Lyszczarz | A63B 21/156 482/103 |
| 8,926,480 B2 | 1/2015 | Lyszczarz | |
| 2002/0091043 A1 | 7/2002 | Rexach | |
| 2002/0193213 A1* | 12/2002 | Batca | A63B 21/0628 482/92 |
| 2003/0017918 A1 | 1/2003 | Webb et al. | |
| 2004/0029688 A1* | 2/2004 | Webber | A63B 21/155 482/142 |
| 2005/0096197 A1* | 5/2005 | Webber | A63B 23/03525 482/94 |
| 2006/0264304 A1* | 11/2006 | Habing | A63B 23/0494 482/98 |
| 2007/0037674 A1 | 2/2007 | Finn et al. | |
| 2007/0213185 A1* | 9/2007 | Habing | A63B 21/00047 482/100 |
| 2009/0170668 A1* | 7/2009 | Giannelli | A63B 23/03533 482/94 |
| 2013/0217546 A1 | 8/2013 | Heideman | |

OTHER PUBLICATIONS

European Patent Office, Extended European Search Report for European Patent Application No. 16842666.6, dated Mar. 25, 2019, 10 pages.

* cited by examiner

CONVERTIBLE BENCH AND UPRIGHT STABILIZING SUPPORT

CROSS-REFERENCE TO RELATED APPLICATIONS

This application is a Continuation of U.S. patent application Ser. No. 15/248,938 filed Aug. 26, 2016, which claims the benefit of U.S. Provisional Application No. 62/211,346 filed Aug. 28, 2015, both of which are incorporated herein by reference in their entirety for all purposes.

FIELD OF THE INVENTION

The following description generally relates to fitness equipment. Specifically, the embodiments of the present invention are directed to an exercise machine that includes a workout bench for supporting a user. The workout bench may support a user in a seated position, or support a user's back, chest, thigh, or other body member as the user performs different exercise routines in other positions.

BACKGROUND OF THE INVENTION

An exercise machine may include multiple stations for performing different exercise routines in different positions. For example, an exercise machine may include a stationary bench for supporting a user while performing exercise routines in a seated position. Another station may include a stabilizing support for supporting a user while performing an exercise routine in a standing position.

A functional trainer is a class of exercise machine that has become popular in recent year because of their versatility. Specifically, functional trainers include adjustable components that allow the user to perform a wide variety of exercises in a wide variety of positions. Thanks to their ability to transform themselves into different configurations, they can mimic most of the traditional multi-station machines and free weights with just a few adjustments. There are many types of functional trainers on the market today, and they use several different methods for adjusting their components. Most of them use adjustable arms, sliding carriages with pulleys or multiple pulleys mounted at different locations on the machine. Some of them can be used with a workout bench. The number of exercises that can be performed on particular machine depends on how many different configurations it can be transformed into. More configurations provide more exercise options for the user. There is a large demand for functional trainers—both in commercial and home gyms—because they can be adapted for use in a wide variety of exercises while taking up relatively little space when compared to traditional exercise machines and free weights.

Accordingly, a need exists for a versatile exercise machine, such as a functional trainer, that includes a bench that can be adapted to support a user in a sitting position and that can also be adapted to serve as a stabilizing support. The embodiments of the present invention solve this problem by providing an exercise machine that includes a convertible bench adaptable to support a user performing exercises in a sitting position and adaptable to provide a stabilizing support for a user performing exercises in a non-sitting position, including in a standing position. Other advantages of the present invention will become apparent to one skilled in the art.

SUMMARY OF THE INVENTION

This Summary is provided to introduce a selection of concepts in a simplified form that are further described below in the Detailed Description. This Summary is not intended to identify key features or essential features of the subject matter, nor is it intended to be used as an aid in determining the scope of the subject matter.

In one aspect, an exercise machine includes a swing-away workout station and rotating arm assemblies. The swing-away workout station may be adjustable from an in-use position at the front of the exercise machine to a stowed-away position at the side of the exercise machine. The rotating arm assemblies may be movable vertically with respect to a vertical center post of the exercise machine.

In another aspect, a swing-away workout station may be used with an exercise machine and may be adjustable from an in-use position at the front of the exercise machine to a stowed-away position at the side of the exercise machine. The swing-away workout station may include a bench seat and a stabilizing support that are pivotable forwardly and backwardly. The bench seat is capable of supporting the weight of a user performing exercises in a seated position. The stabilizing support is capable of providing a stabilizing support for a user performing exercises in a non-seated position. The stabilizing support may extend upwardly and downwardly to provide stabilizing support for various portions of a user's body while the user is performing different exercise routines.

BRIEF DESCRIPTION OF THE DRAWINGS

The foregoing summary, as well as the following detailed description, will be better understood when read in conjunction with the appended drawings. For the purpose of illustration, certain embodiments of the present invention are shown in the drawings. It should be understood, however, that the invention is not limited to the precise arrangements and embodiments shown. The accompanying drawings, which are incorporated in and constitute a part of this specification, illustrate an implementation of systems, apparatuses, and methods consistent with the present description and, together with the description, serve to explain advantages and principles consistent with the invention.

Figure 1:
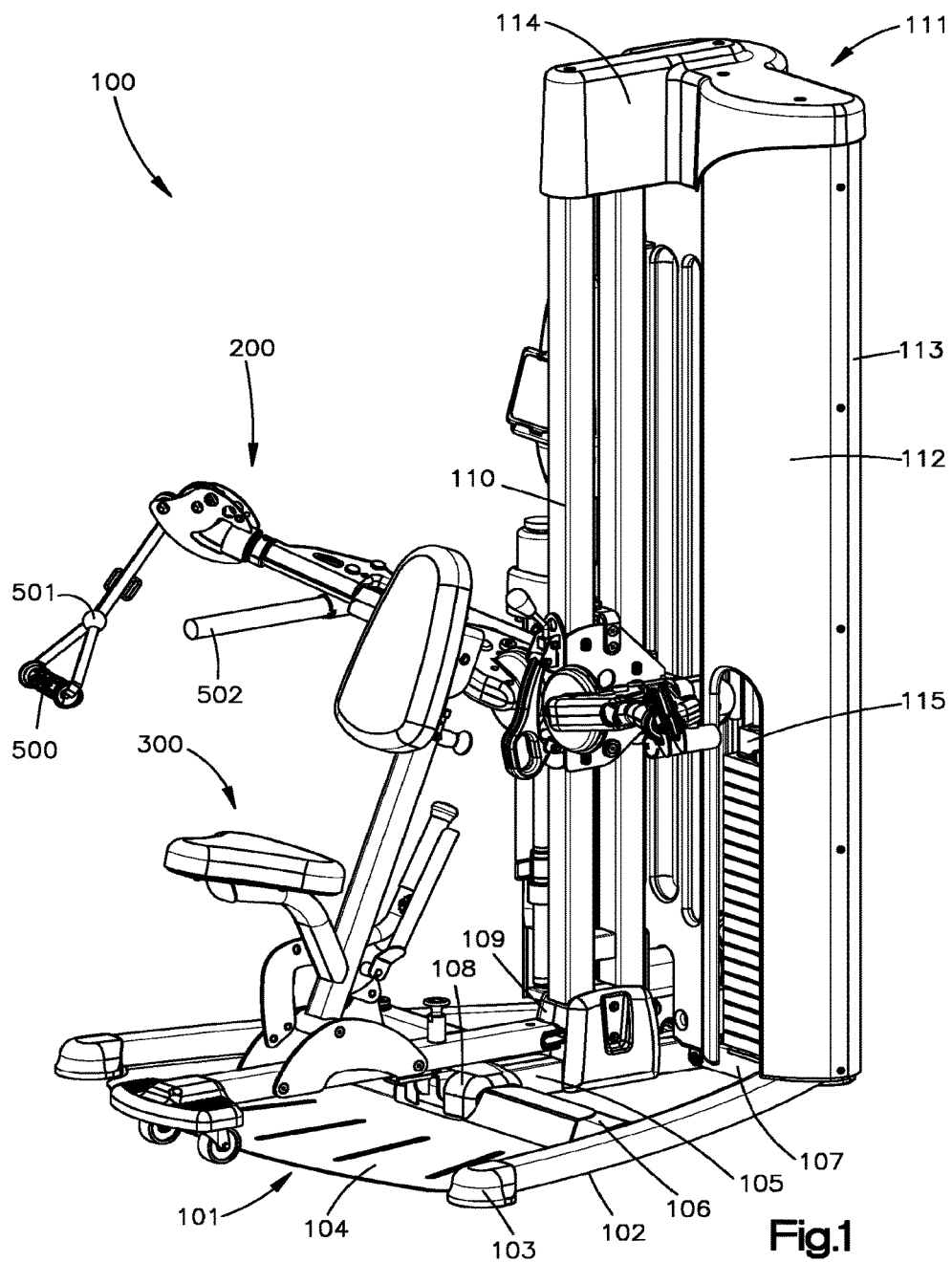
FIG. 1 is a diagram illustrating an example of an exercise machine including a base, rotating arm assemblies, and a swing-away workout station that includes a bench seat and a stabilizing support.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The embodiments of the present invention will now be described more fully with reference to the accompanying drawings, in which preferred embodiments of the invention are shown. The following detailed description is provided to assist the reader in gaining a comprehensive understanding of the methods, apparatuses, and/or systems described herein. This invention may, however, be embodied in many different forms and should not be construed as limited to the illustrated embodiments set forth herein. Accordingly, various changes, modifications, and equivalents of the systems, apparatuses and/or methods described herein will be suggested to or understood by those of ordinary skill in the art. Also, descriptions of well-known functions and constructions may be omitted for increased clarity and conciseness.

In the following description, like reference characters designate like or corresponding parts throughout the figures. It is to be understood that the phraseology and terminology used in the following description are used for the purpose of description and enablement, and should not be regarded as limiting. Additionally, in the following description, it is understood that terms such as "top," "bottom," "side," "front," "back," "inner," "outer," and the like, are words of convenience and are not to be construed as limiting terms.

Figure 2:
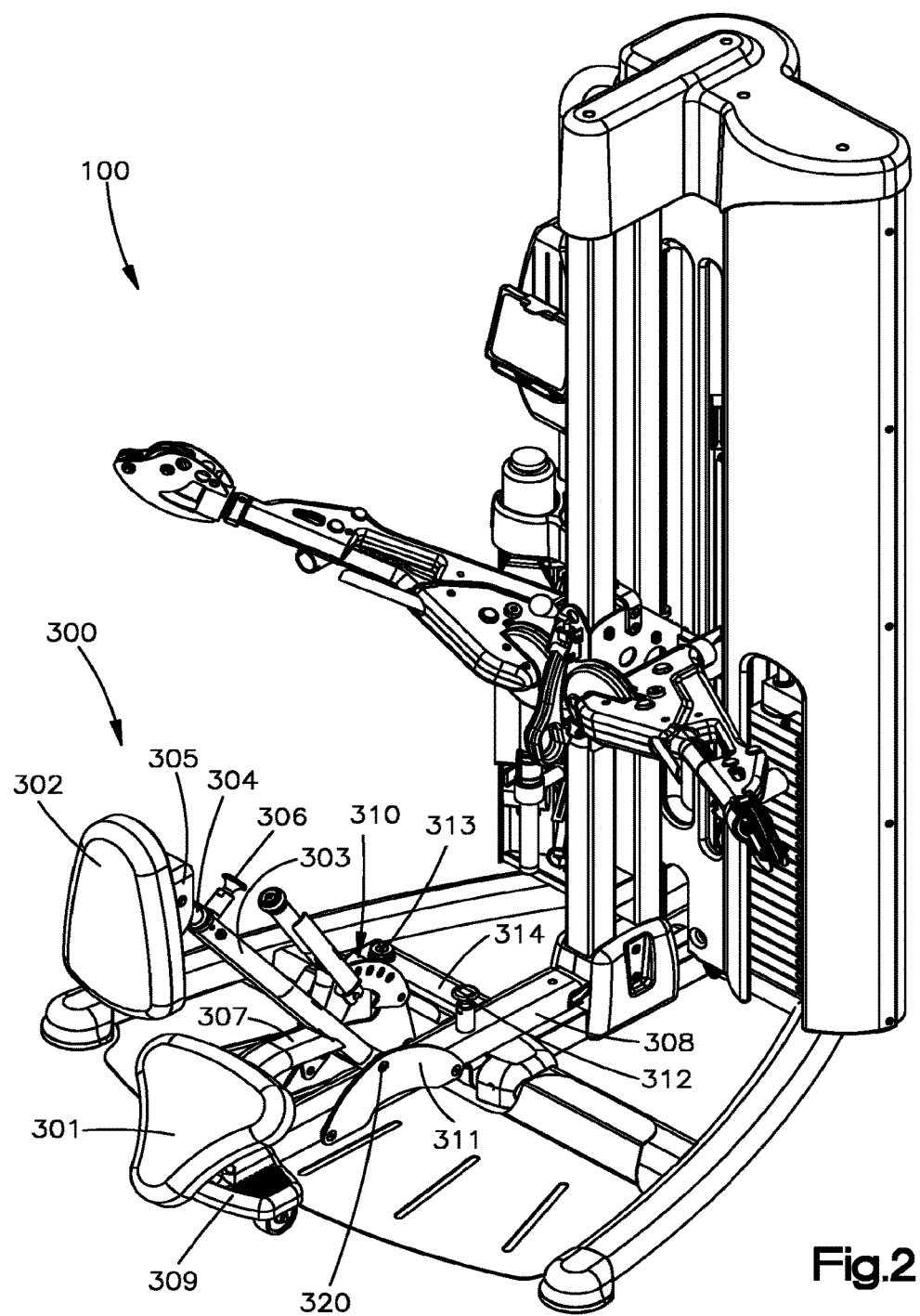
FIG. 2 is a diagram illustrating the exemplary exercise machine as depicted in FIG. 1, where the swing-away workout station is in a forward-pivoted position.
Figure 3:
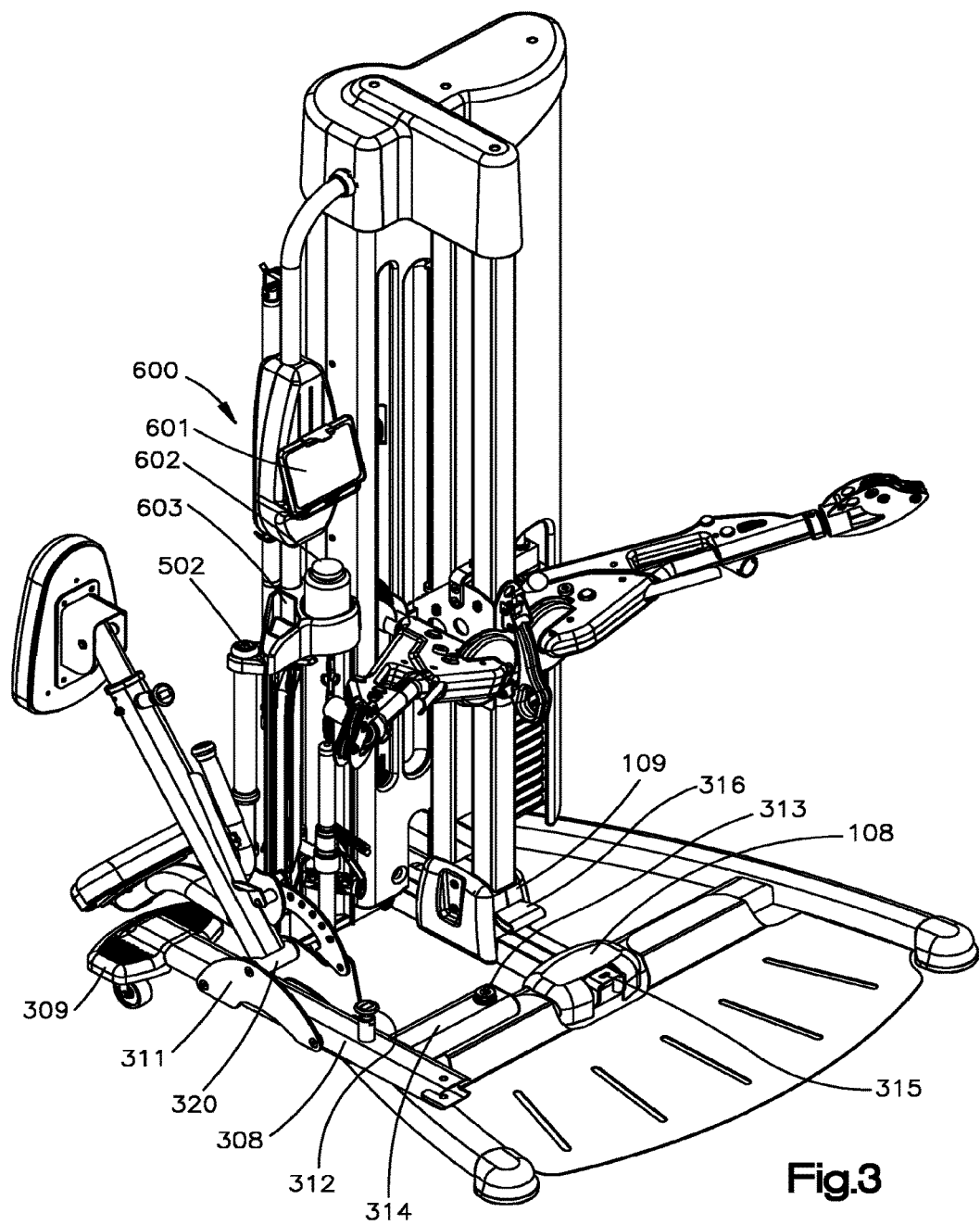
FIG. 3 is a diagram illustrating the exemplary exercise machine as depicted in FIG. 1, where the swing-away workout station is stowed at the side of the exercise machine.

FIGS. 1-3 are diagrams illustrating an example of an exercise machine 100. The exercise machine 100 may be that disclosed in U.S. patent application Ser. No. 14/564,916, which is incorporated herein by reference, or an equivalent exercise device. Referring to the example illustrated in FIG. 1, the exercise machine 100 includes a base assembly 101 for supporting the exercise machine 100, a swing-away workout station 300 for supporting a user who is using the exercise machine 100, and rotating arm assemblies 200 for use by the user in performing different exercise routines.

The base assembly 101 may include two horizontal side struts 102 on opposite sides of the exercise machine 100. Each of the horizontal side struts 102 forms a supporting structure for the exercise machine 100 and is supported by a support foot 103 on each end thereof. A central reinforcement strut 105 further supports the exercise machine 100 by extending in a direction substantially parallel to the two horizontal side struts 102 and between each of the horizontal side struts 102 at a central position.

The horizontal side struts 102 and the central reinforcement strut 105 are connected by two cross struts 106, 107. A front cross strut 106 connects the two horizontal side struts 102 with the front end of the central reinforcement strut 105, and a rear cross strut 107 connects the two horizontal side struts 102 with the rear end of the central reinforcement strut 105. In this example, a base plate 104 is included on the floor surface and secured by opposite upper portions of the front cross strut 106. The base plate 104 may extend forwardly and between the two horizontal side struts 102.

In this example, a strut cover 108 is used to cover the front end of the central reinforcement strut 105 and the front cross strut 106 at the position where the central reinforcement strut 105 and the front cross strut 106 are attached. A central base 109 extends vertically upwards from a position in the middle of the central reinforcement strut 105 for supporting a vertical center post 110. The vertical center post 110 supports the rotating arm assemblies 200 which move up and down to different positions along the vertical center post 110. The movement of the rotating arm assemblies 200 with respect to the vertical center post 110 will be described in more detail below in reference to FIG. 1113.

A weight stack housing 111 is used for housing a weight stack assembly 115 at the rear of the exercise machine 100. The weight stack housing 111 includes a front cover 112, a rear cover 113, and a top cover 114. The front cover 112 and the rear cover 113 are attached to one another with the front cover 112 having an opening for allowing a user to access and adjust the weight stack assembly 115. The top cover 114 covers the top of the front cover 112 and the rear cover 113, and also covers the top of the vertical center post 110 for attaching the weight stack housing 111 to the vertical center post 110.

Referring to FIGS. 1-3, the exercise machine 100 includes a swing-away workout station 300. The workout station 300 may be used for supporting a user in a seated position, or as in the example illustrated in FIG. 2, the workout station 300 may be adjusted for use as a stabilizing support to support a under in other positions, such as in a standing position. The workout station 300 may be in a position at the front of the exercise machine 100, as illustrated in FIGS. 1 and 2, or may be stowed away at a position on the side of the exercise machine 100, as illustrated in FIG. 3. Another embodiment of the workout station 300 is described with further detail in U.S. patent application Ser. No. 14/564,916, which is incorporated herein by reference, and which typically refers to the workout station as a "swing-away bench assembly" or "bench assembly 180."

Referring still to FIGS. 1-3, the workout station 300 includes a bench seat 301, a stabilizing support 302, and two telescoping bench posts 303, 304 that are slidingly engaged for adjustably attaching the stabilizing support 302 to the workout station 300. The interior post 304 fits within the exterior post 303 and can be slid longitudinally in relation thereto for adjusting the position of the stabilizing support 302 with respect to the bench seat 301 and the exercise machine 100. The bench seat 301 may be permanently or rotatably attached to the exterior post 303 by a seat post 307.

In this example, the seat post 307 and the exterior post 303 are integrally formed. A support bracket 305 may be used for attaching the stabilizing support 302 to the interior post 304. In this example, the support bracket 305 may freely pivot about the top end of the interior post 304; however, it should be appreciated that the support bracket 305 may include a locking mechanism for locking the position and orientation of the stabilizing support 302 with respect to the interior post 304.

A locking pin 306 attached to the exterior post 303 may be used for locking the position of the interior post 304 with respect to the exterior post 303. The interior post 304 includes a number of alignment holes for receiving the locking pin 306 of the exterior post 303. Thus, by selectively engaging one or more of the alignment holes of the interior post 304 with the locking pin 306 of the exterior post 303, the interior post 304 and exterior post 303 may be locked together such that the interior post 304 cannot be slid longitudinally in relation to the exterior post 303. Accordingly, the position of the stabilizing support 302 may be adjusted by pulling the locking pin 306 to retract the locking pin 306 from one or more alignment holes of the interior post 304. The interior post 304 (along with the attached stabilizing support 302) may then be slid longitudinally with respect to the exterior post 303, and then once the stabilizing support 302 is in the desired position, the locking pin 306 may be released for selectively engaging with another one or more alignment holes of the interior post 304. A spring mechanism (not shown) may bias the locking pin 306 towards the alignment holes of the interior post 304, such that a user pulls the locking pin 306 to retract it from the alignment holes in order to allow for adjustment. Then, once the stabilizing support 302 is in the desired position, the user simply releases the locking pin 306 into the selected one or more alignment holes in order to lock the exterior post 303 and interior post 304 together.

The workout station 300 includes a base strut 308 for movably attaching the workout station 300 to the exercise machine 100. The exterior post 303 is pivotally connected to the base strut 308. More specifically, two mounting brackets 311 are attached to opposite sides of the base strut 308. The exterior post 303 includes a pivot sleeve at the end opposite the stabilizing support 302, which is pivotally mounted between the mounting brackets 311. A pivot pin 320 passes through both mounting brackets 311 and the pivot sleeve of the exterior post 303, thus pivotally mounting the exterior post 303 on the base strut 308. As a result, the user-support portion of the workout station 300 (i.e., the stabilizing support 302, bench seat 301, exterior post 303, interior post 302, and seat post 307) are all pivotably connected to the base strut 308 and rotatable about a pivot axis that is coincident with the longitudinal axis of the pivot pin 320.

As discussed above, the two mounting brackets 311 are attached to opposite sides of the base strut 308. The mounting brackets 311 further secure pivot adjustment mechanism 310 to the base strut 308. The pivot adjustment mechanism 310 provides for selectively adjustable pivoting of the user-support portion of the workout station 300 (i.e., the stabilizing support 302, bench seat 301, exterior post 303, interior post 302, and seat post 307), and will be described in more detail below in reference to FIGS. 4 and 5.

Referring to FIG. 3, the base strut 308 is attached to a wheel assembly 309 at its front end and a side strut 314 at a mid-portion thereof. The side strut 314 of the workout station 300 may be pivotally attached to the front cross strut 106 of the base 101 of the exercise machine 100 by a pivot pin 313. The attachment of the side strut 314 by the pivot pin 313 allows a user to rotate the workout station 300 to place it in the stowed position at a side of the exercise machine 100, as illustrated in FIG. 3, or at the front of the exercise machine 100, as illustrated in FIG. 2. Further, the wheel assembly 309 allows for easy movement of the workout station 300.

The workout station 300 may be locked and unlocked from its initial position at the front of the exercise machine using a locking pin 312. The locking pin 312 is similar to the locking pin 306 described in connection with the adjustable stabilizing support 302, and may be inserted into and retracted from a hole 315 in the strut cover 108. The locking pin 312 may be spring-biased towards hole 315, such that a user pulls the locking pin 312 to retract it from hole 315 in order to allow for movement of the workout station 300 away from the front of the exercise machine 100 (FIGS. 1 & 2), and toward the stowed position at a side of the exercise machine 100 (FIG. 3).

The hole 315 and strut cover 108 are configured such that, as the workout station 300 is moved away from the front of the exercise machine 100 (FIGS. 1 & 2), the user need only hold the locking pin 312 in the retracted position for a relatively small portion of the workout station's 300 total travel path. That is, the workout station 300 need only travel a little ways before the locking pin 312 can be released without contacting the hole 315 or the strut cover 108.

Conversely, the front surface of the strut cover 108 may include a ramped surface such that, as the workout station 300 is moved into position at the front of the exercise machine 100 (FIGS. 1 & 2), the locking pin 312 engages the ramped surface, which pushes the locking pin 312 up into the retracted position. Once the retracted locking pin 312 is aligned with the hole 315 in the strut cover 108, the spring (or alternatively, gravity) biases the locking pin 312 into the hole 315. Accordingly, the user need not pull the locking pin 312 into the retracted position when moving the workout station 300 into the locked position at the front of the exercise machine 100 (FIGS. 1 & 2).

Additionally, the rear portion of the base strut 308 may be received by a front extension 316 of the central base 109 when the workout station 300 is moved into position at the front of the exercise machine 100 (FIGS. 1 & 2). This receiving extension 316 might, therefore, provide additional guidance of the workout station 300 to ensure that it travels into the correct, lockable position at the front of the exercise machine 100 (FIGS. 1 & 2). The receiving extension 316 might also provide further support for the base strut 308 of the workout station 300 once it is locked into position at the front of the exercise machine 100.

Figure 4:
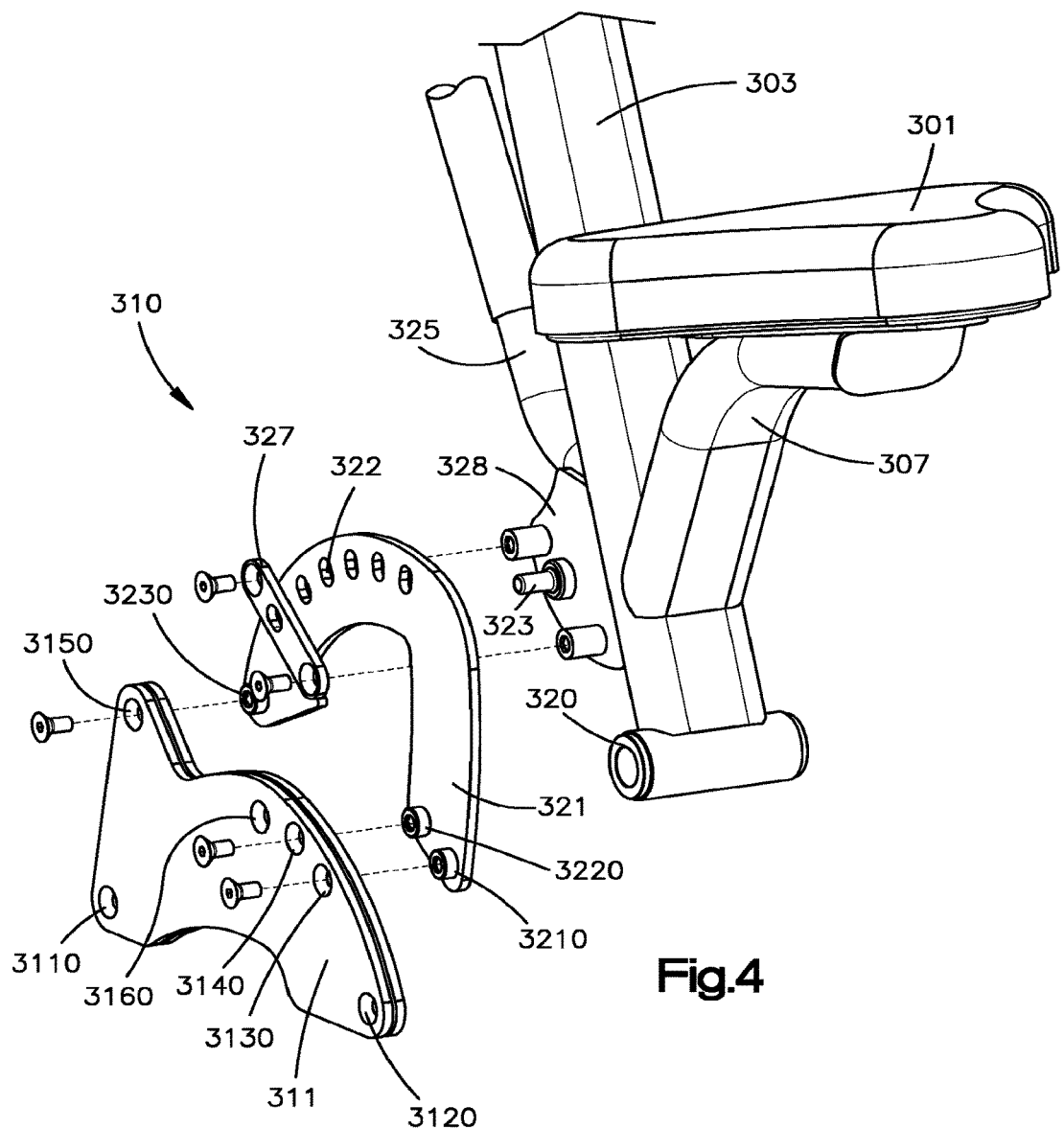
FIG. 4 is a diagram illustrating an exploded side-view of the pivot mechanism of the swing-away workout station of the exemplary exercise machine depicted in FIG. 1.
Figure 5:
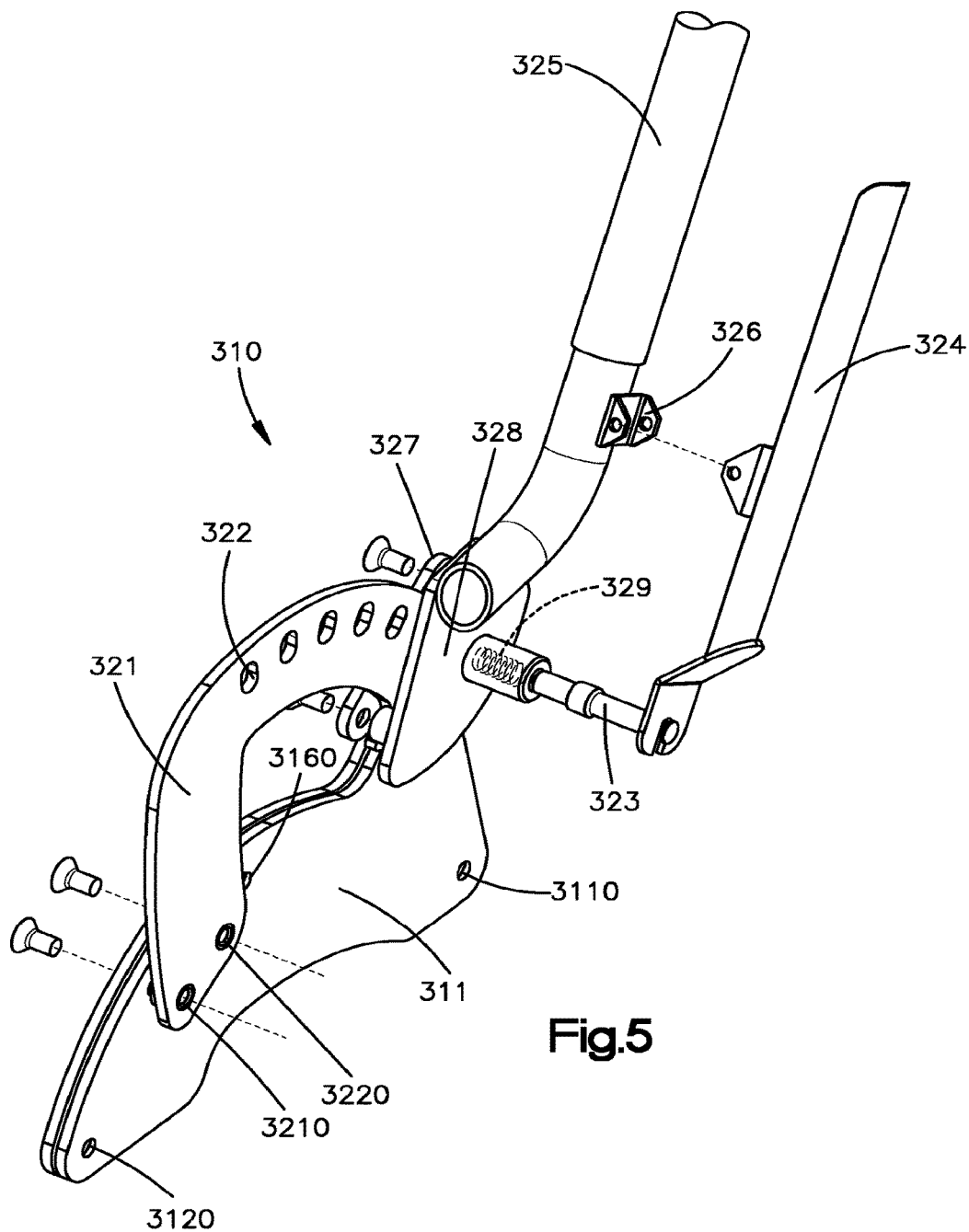
FIG. 5 is a diagram illustrating another exploded side-view of the pivot mechanism of the swing-away workout station of the exemplary exercise machine depicted in FIG. 1.

FIGS. 4 and 5 are diagrams illustrating an example of the pivot adjustment mechanism 310 for pivoting the user-support portion of the workout station 300 (i.e., the stabilizing support 302, bench seat 301, exterior post 303, interior post 302, and seat post 307). The pivot adjustment mechanism includes the pivot pin 320, a pivot adjustment plate 321 having holes 322 for receiving a locking pin 323, a locking pin handle 324 for controlling movement of the locking pin 323, a pivot adjustment handle 325 for controlling movement of the user-support portion of the workout station 300 (i.e., the stabilizing support 302, bench seat 301, exterior post 303, interior post 302, and seat post 307), a handle hinge 326 for pivotally connecting the locking pin handle 324 to the pivot adjustment handle 325, a locking pin plate 327 for securing the locking pin 323 on the outer side of the pivot adjustment plate 321, and a rear post extension 328 for attaching the locking pin 323 and the locking pin plate 327 to the exterior post 303.

Referring to FIG. 4, two mounting brackets 311 are used for attaching the pivot adjustment mechanism 310 to the base strut 308 (not shown in FIG. 4). Each mounting bracket 311 may have six holes including first and second holes 3110, 3120 for attaching the mounting bracket 311 to the base strut 308 of the workout station 300; third, fourth and fifth holes 3130, 3140, 3150 for attaching the mounting bracket 311 to an end of the pivot adjustment plate 321; and a sixth hole 3160 for receiving the pivot pin 320 and pivotally attaching the exterior post 303 to the mounting bracket 311. Holes 3130, 3140, 3150 of the left mounting bracket 311 are used for attachment to the pivot adjustment plate 321 at its first, second, and third holes 3210, 3220, 3230. It should be appreciated that while only the left mounting bracket 311 is illustrated in FIG. 4, the right mounting bracket 311 is similar to the left cover mounting bracket 311. However, because the pivot adjustment plate 321 in the depicted embodiment is only provided on the left side of the workout station 300, the right mounting bracket 311 may optionally include only three holes 3110, 3120, 3160—in which case the holes 3130, 3140, 3150 that are used for attachment to the pivot adjustment plate 321 may be omitted from the right mounting bracket 311.

Referring to FIG. 5, the locking pin 323 is received by holes 322 of the pivot adjustment plate 321 for adjusting the angle of the bench seat 301 and stabilizing support 302. The locking pin 323 is biased towards the holes 322 of the pivot adjustment plate 321 by a spring 329 and retracted using the locking pin handle 324. To adjust the pivot position of the user-support portion of the workout station 300 (i.e., the stabilizing support 302, bench seat 301, exterior post 303, interior post 302, and seat post 307), a user may press the locking pin handle 324 laterally toward the pivot adjustment handle 325 in order to retract the locking pin 323 from the hole 322. The user may then rotate the pivot adjustment handle 325 about the pivot pin 320. This, in turn, rotates the locking pin 323 and the locking pin plate 327, the rear post extension 328 of the exterior post 303, and the user-support portion of the workout station 300 (i.e., the stabilizing support 302, bench seat 301, exterior post 303, interior post 302, and seat post 307) about the pivot pin 320. Once the user-support portion of the workout station 300 is in the desired position, the user may release the locking pin handle 324, which will allow the spring-biased locking pin 323 to engage into a selected hole 322 in the pivot adjustment plate 321.

Figure 6:
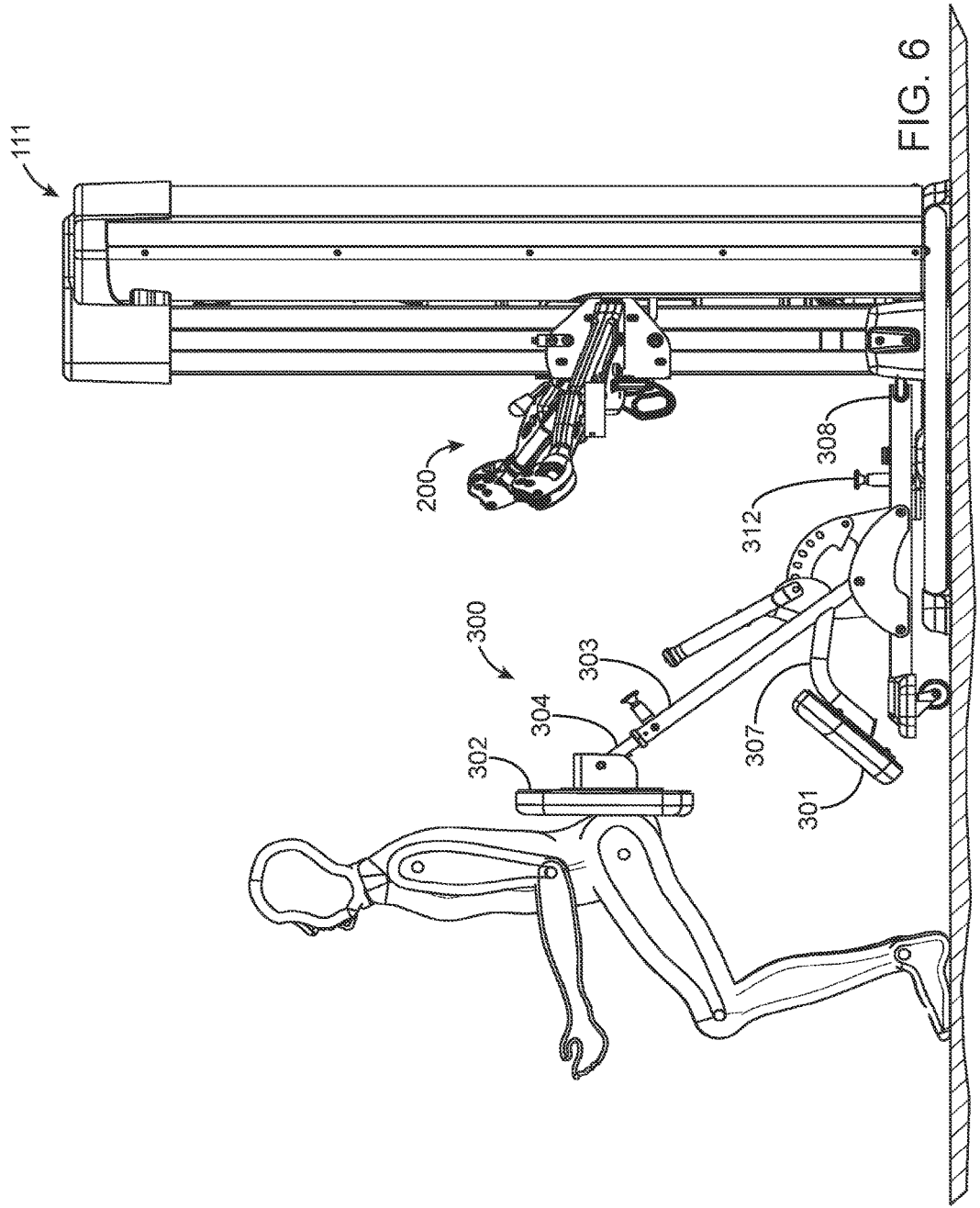
FIG. 6 is a diagram illustrating the exemplary exercise machine as depicted in FIG. 1, where the swing-away workout station is configured to provide a stabilizing support at hip level, for a user performing an exercise while standing and facing away from the exercise machine.
Figure 7:
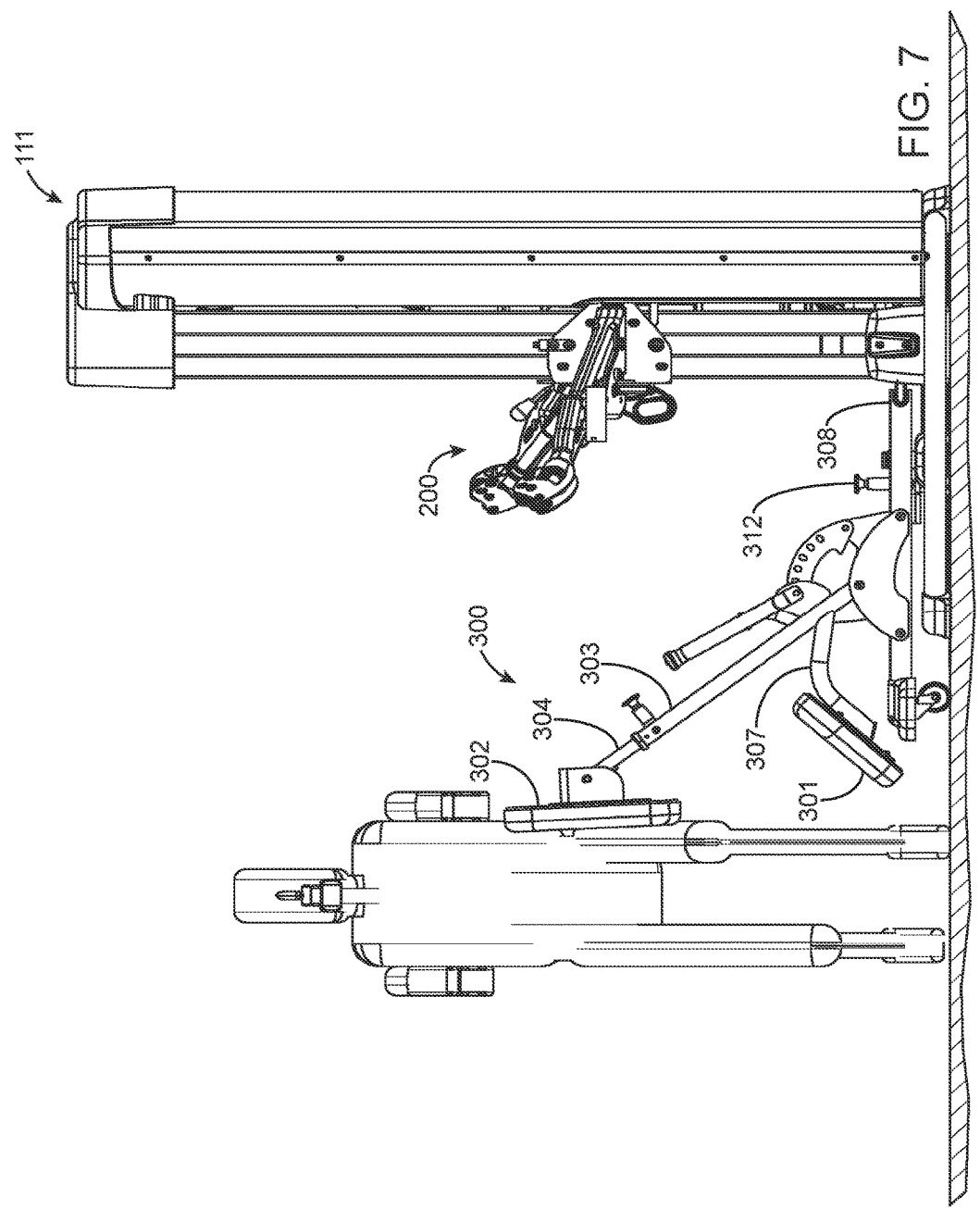
FIG. 7 is a diagram illustrating the exemplary exercise machine as depicted in FIG. 1, where the swing-away workout station is configured to provide a stabilizing support at hip level, for a user performing an exercise while standing and facing in a lateral direction with respect the exercise machine.
Figure 8:
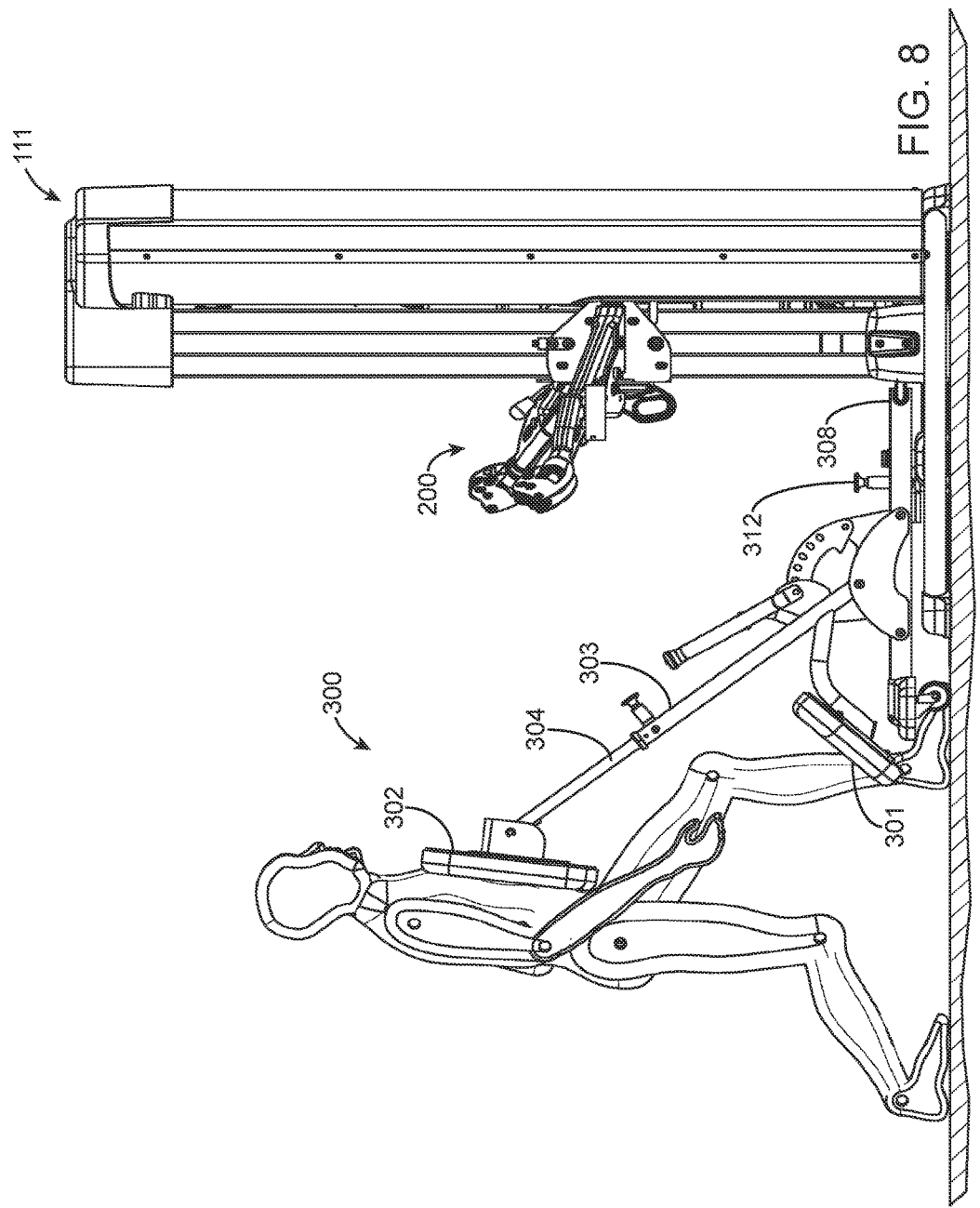
FIG. 8 is a diagram illustrating the exemplary exercise machine as depicted in FIG. 1, where the swing-away workout station is configured to provide a stabilizing support at mid-chest level, for a user performing an exercise while standing and facing toward the exercise machine.
Figure 9:
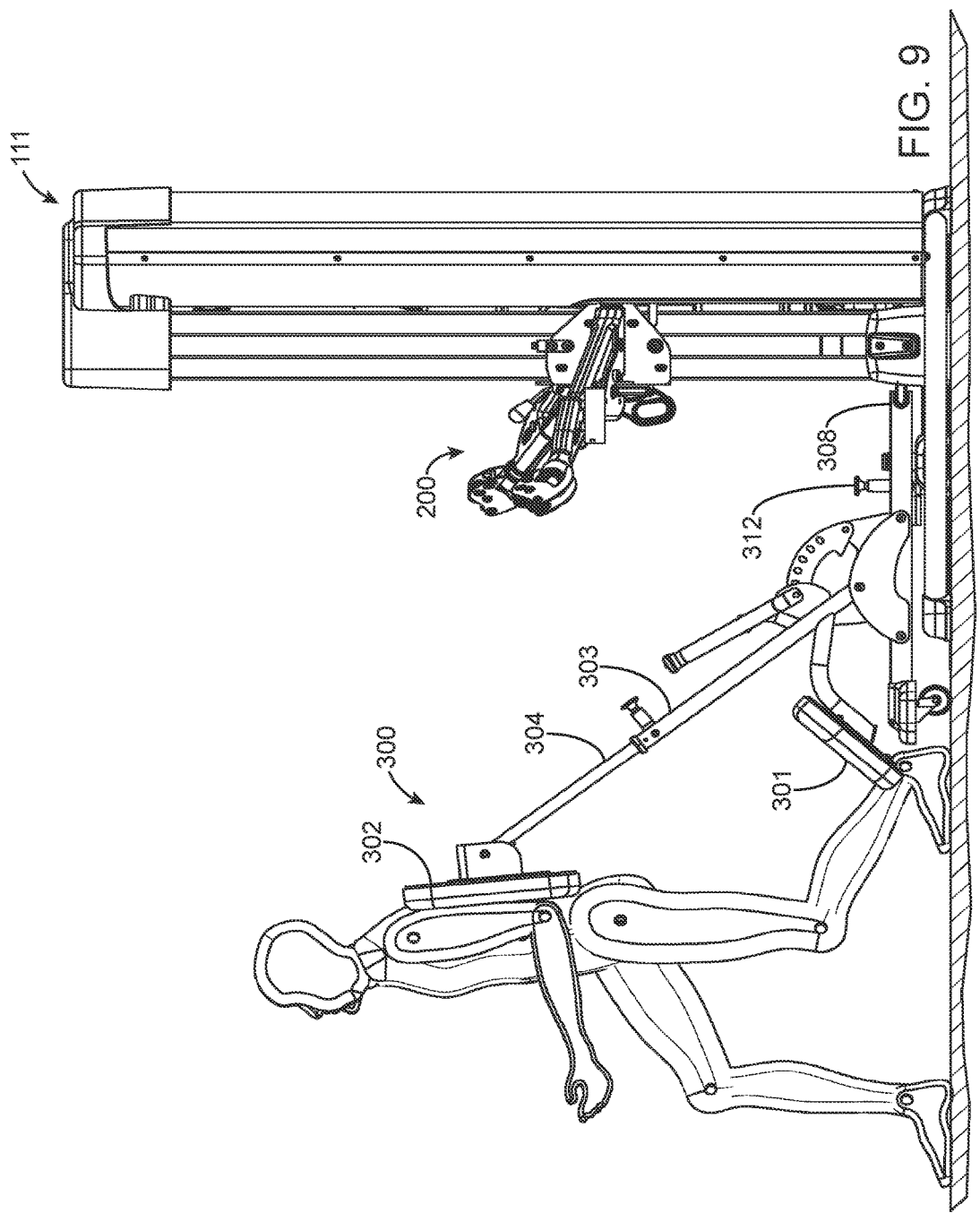
FIGS. 9 and 10 are diagrams illustrating the exemplary exercise machine as depicted in FIG. 1, where the swing-away workout station is configured to provide a stabilizing support at mid-chest level, for a user performing an exercise while standing and facing away from the exercise machine.
Figure 10:
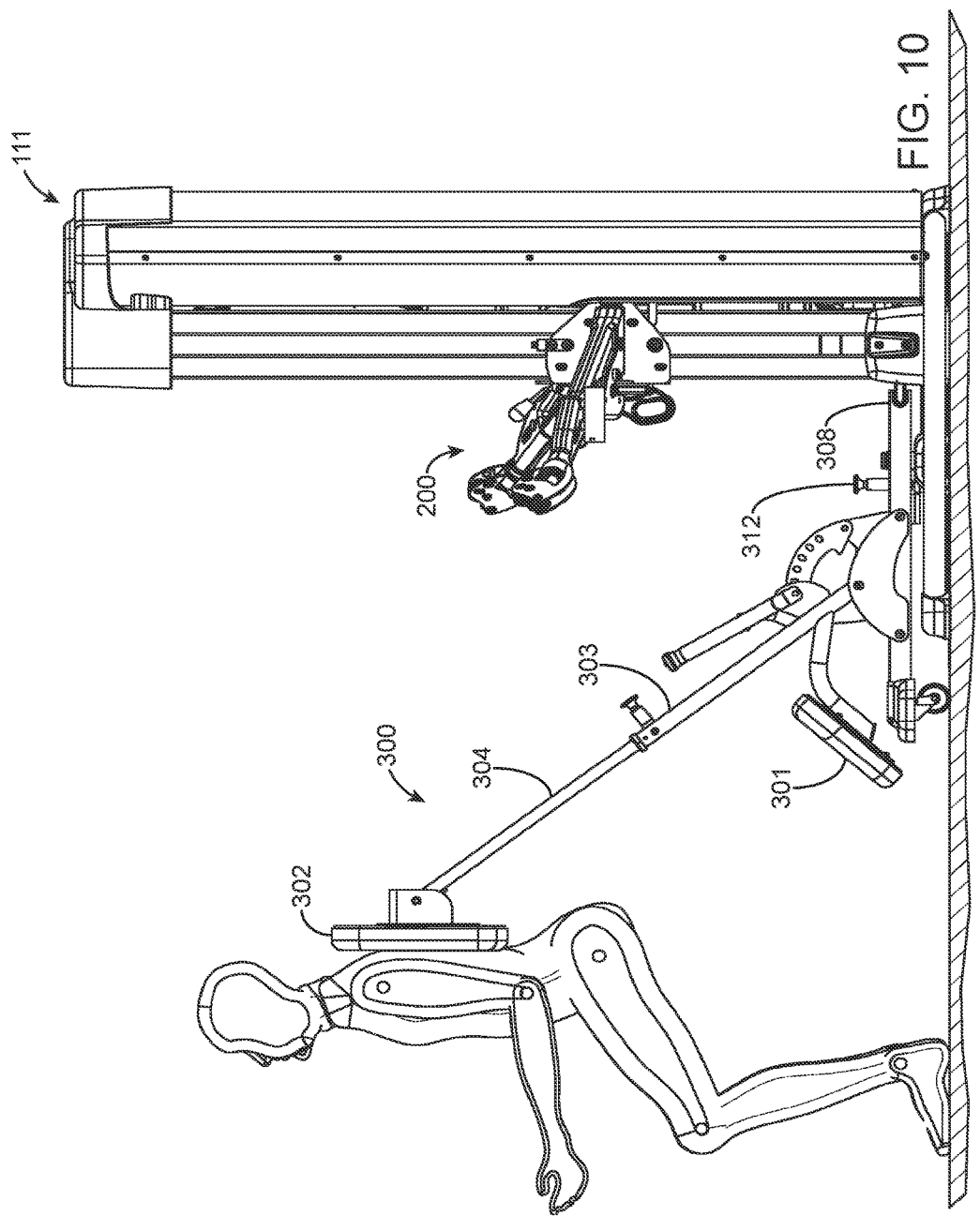

As illustrated in FIGS. 6-10, the vertical extension of the stabilizing support 302 along with the pivoting of the user-support portion of the workout station 300 (i.e., the stabilizing support 302, bench seat 301, exterior post 303, interior post 302, and seat post 307) allow for several versatile configurations and for convertibility of the exercise machine 100. For example, as illustrated in FIG. 6, the user-support portion of the workout station 300 may be configured such that the stabilizing support 302 supports a user's lower back at hip-level while the user is facing away from the exercise machine 100. As in FIG. 7, the user-support portion of the workout station 300 may be configured such that the stabilizing support 302 supports the user's side at hip-level while the user performs different exercise routines. As in FIG. 8, the user-support portion of the workout station 300 may be configured such that the stabilizing support 302 supports a user's chest while the user is facing the exercise machine 100. As in FIGS. 9 and 10, the user-support portion of the workout station 300 may be configured such that the stabilizing support 302 supports the user's back at mid-chest level, and may be adjusted at different angles for providing support to different regions of the neck or upper back based on the desired exercise routine. Also, the user-support portion of the workout station 300 may be configured to achieve other positions for the stabilizing support 302 where the stabilizing support 302 supports other parts of the user's body such as the user's shoulders, head, and/or legs.

It should be appreciated that the examples illustrated in FIGS. 6-10 are non-limiting examples of the position of the user-support portion of the workout station 300 (i.e., the stabilizing support 302, bench seat 301, exterior post 303, interior post 302, and seat post 307). Further, it should be appreciated that the range, precision, and degree of extension of the stabilizing support 302 (by selective engagement of one or more of the alignment holes of the interior post 304 with the locking pin 306 of the exterior post 303) and the range, precision, and degree of pivoting of the user-support portion of the workout station 300 (by selectively engaging the locking pin 323 into one or more holes 322 in the pivot adjustment plate 321), can be modified by one of ordinary skill in the art. For example, the degree of pivoting of the user-support portion of the workout station 300 can be configured such that the exterior post 303 is adjustable in a range between about 0 degrees and about 180 degrees with respect to the horizontal. Preferably, the degree of pivoting can be modified such that the adjustment can range between about 30 degrees and about 150 degrees with respect to the horizontal.

Further, the size of the exterior post 303 and the interior post 304 can vary such that the interior post 304 and the attached stabilizing support 302 can reach a number of different positions. In an example, when the exterior post 303 is at a 90 degree angle with respect to the horizontal, the interior post 304 may be extended such that the bottom end of the stabilizing support 302 is four meters above the base plate 104 of the exercise machine 100. In another example, the interior post 304 may be extended such that the bottom end of the stabilizing support 302 is three meters above the base plate 104. Further, the present invention is not limited as to which of the telescoping posts 303, 304 are "external" and "internal." That is, it will be obvious to one of ordinary skill in the art that in alternative embodiments, the interior post 304 depicted in FIGS. 1-3 could instead be a tube member that is configured to slidingly receive the exterior post 303.

Figure 11:
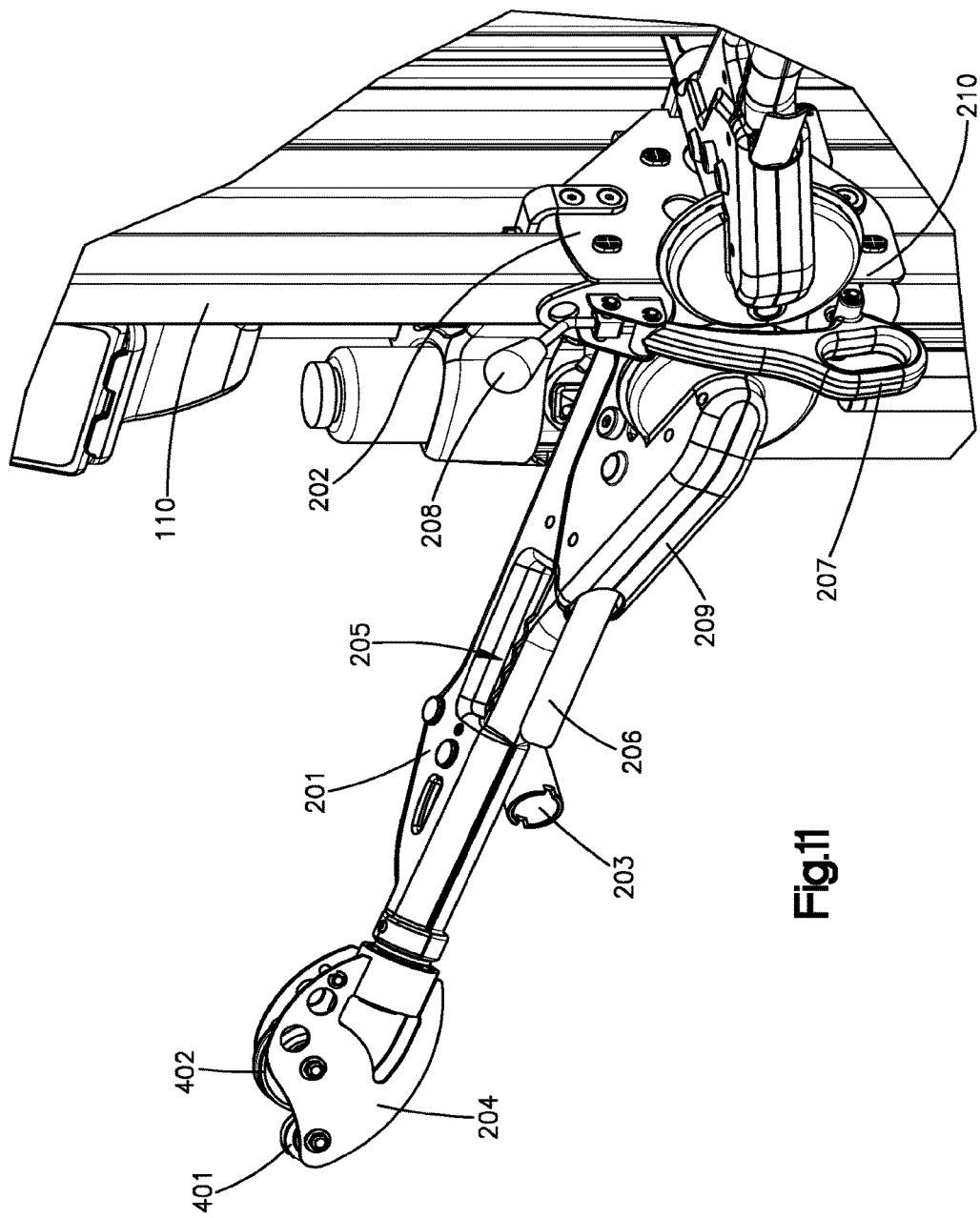
FIG. 11 is a diagram illustrating the rotating arm assemblies of the exemplary exercise machine depicted in FIG. 1.

FIG. 11 is a diagram illustrating exemplary rotating arm assemblies 200. The rotating arm assemblies 200 of the exercise machine 100 may be those described in U.S. patent application Ser. No. 14/564,916, which is incorporated herein by reference, or equivalents. The rotating arm assemblies 200 are mirror images of one another about a vertical plane that passes through vertical center post 110. In the interest of clarity and brevity, only one arm assembly 200 will be described in detail and it should be appreciated that this discussion is applicable to the other arm assembly.

Referring to FIG. 11, each rotating arm assembly 200 includes an arm 201 with an arm reinforcement 209 connected at its mounted end to an arm mounting bracket 202. The rotating arm assembly 200 is pivotally mounted with respect to the arm mounting bracket 202, and can be rotatably adjusted using a gripping region 205 and a rotation adjustment lever 206. The rotating arm assembly 200 may also be moved up and down to different positions along vertical center post 110 using vertical adjustment lever 207, which is fixedly attached to the mounting bracket 202. Removable chin-up and dip bar assemblies may be inserted or attached at bar receiving members 203, which are provided in the midsection of the rotating arm assembly 200.

Figure 12:
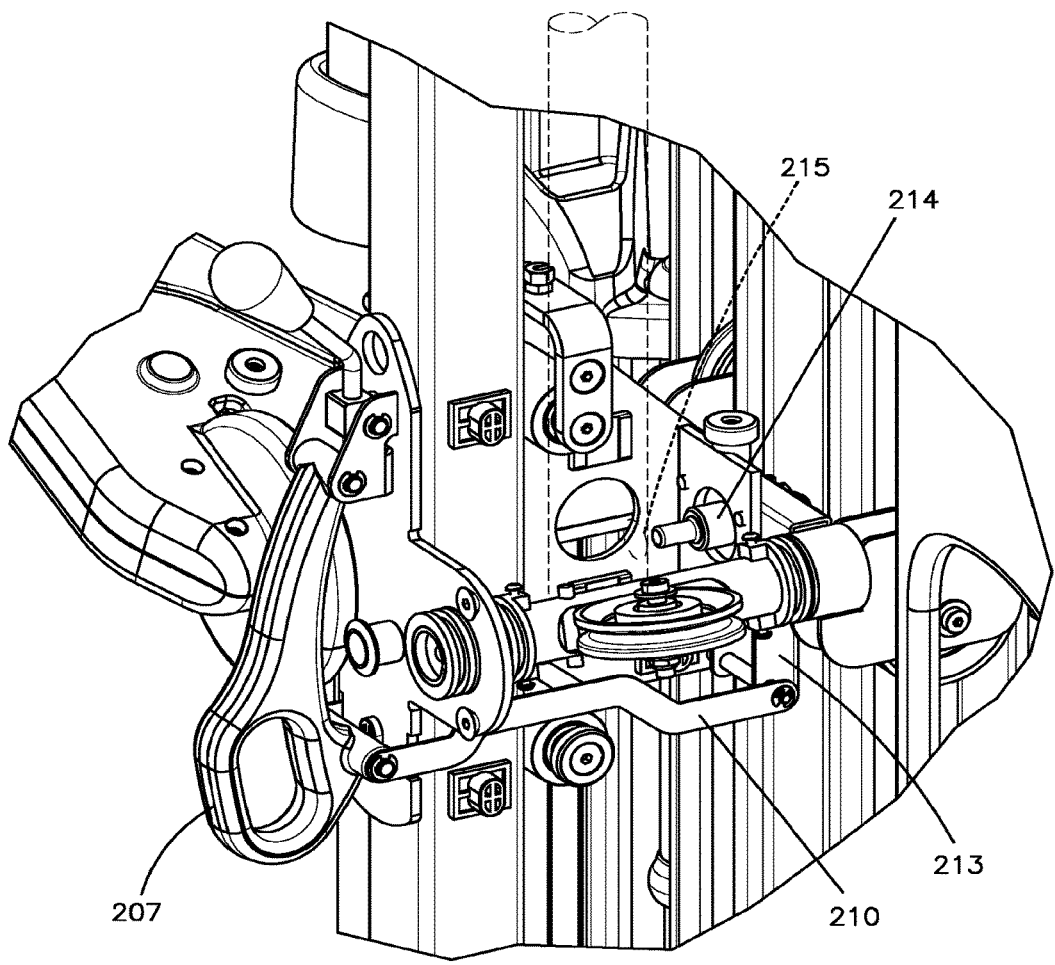
FIG. 12 is a diagram illustrating the arm-mounting mechanism for pivotally mounting the rotating arm assemblies on the vertically-adjustable carriage of the exemplary exercise machine depicted in FIG. 1 (certain components omitted for clarity).

FIG. 12 is a diagram illustrating an example of the vertical adjustment mechanism of rotating arm assemblies 200. As illustrated in FIG. 12, the vertical adjustment lever 207 is connected with horizontal and vertical linkages 210, 213, which extend rearwardly behind the arm mounting bracket 202. A spring-biased locking pin 214 is located at the rear of the mounting bracket 202 and attached to the vertical linkage 213, which is pivotally mounted such that when a user pulls the adjustment lever 207, the horizontal linkage 210 is pulled forward, towards the user. The horizontal linkage 210 pulls a lower end of the vertical linkage 213 forward, causing it to pivot. As the vertical linkage 213 pivots, the upper end of the vertical linkage 213 moves rearwardly, retracting the locking pin 214 from locking pin holes 215. The locking pin holes 215 are on the back surface of the vertical center post 110 such that the locking pin 214 extends forwardly through the mounting bracket 202 and into one or more pin holes 215 on the back surface of the vertical center post 110. Accordingly, referring back to FIG. 11, a user may adjust the vertical position of the arm assemblies 200 by pulling forwardly the vertical adjustment lever 207 and moving the mounting bracket 202 up or down.

As one of ordinary skill in the art will readily appreciate, certain minimum clearance distances are necessary between various components, including, for instance, the arm assemblies 200, vertical center post 110, locking pin 214, and locking pin holes 215. These clearances are necessary to avoid interference fits, i.e., to allow easy movement of the components in light of manufacturing tolerances for the various components. However, it is desirable that these clearances not create any play, looseness, or perceived instability between the exercise machine 100 and its arm assemblies 200. Accordingly, once the arm assemblies 200 are in the desired position, the user may optionally rotate mounting bracket clamping lever 208, which exerts a clamping force on the mounting bracket 202 and vertical center post 110 to eliminate any play or looseness and to further immobilize the arm assemblies 200 with respect to the exercise machine 100.

Figure 13:
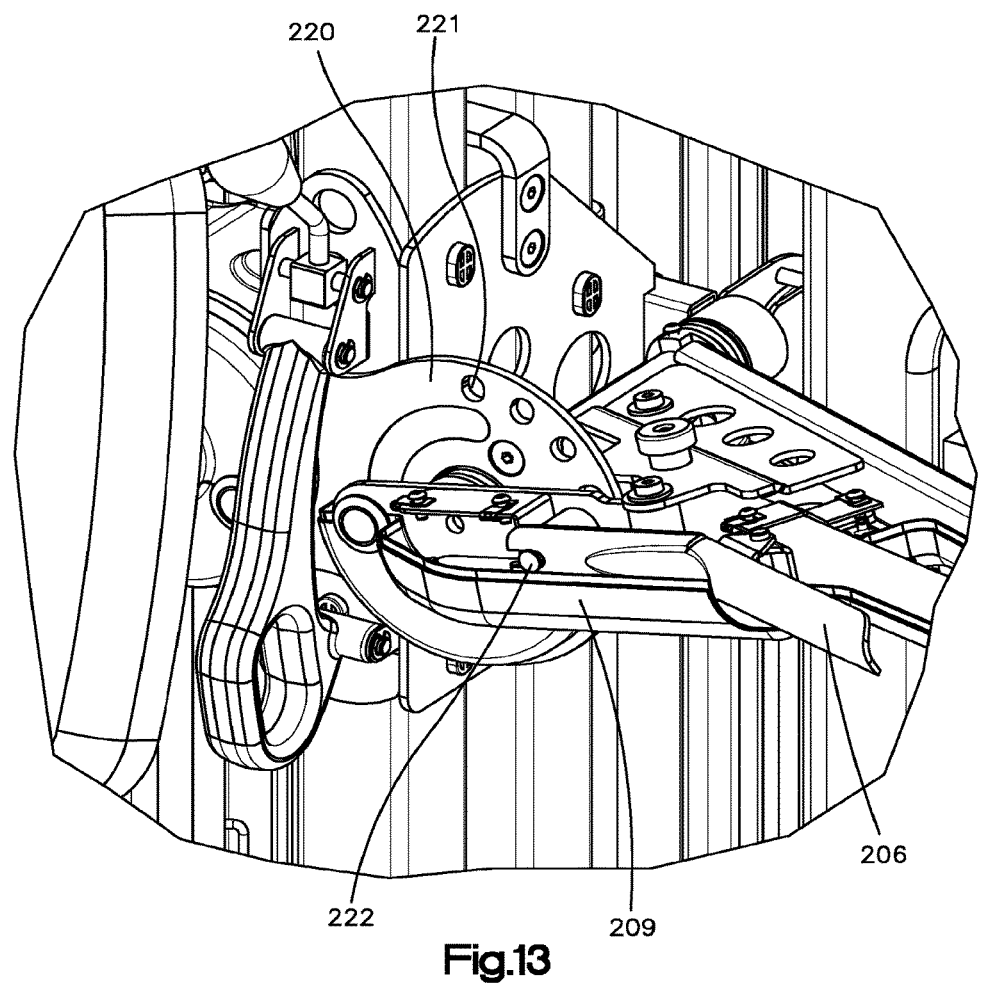
FIG. 13 is a diagram illustrating the mechanism for adjusting the angular position of the rotating arm assemblies of the exemplary exercise machine depicted in FIG. 1 (certain components shown as translucent for clarity).

FIG. 13 is a diagram illustrating an example of the rotation adjustment mechanism of rotating arm assemblies 200. As illustrated in FIG. 13, the rotation adjustment lever 206 extends through arm reinforcement 209 and attaches to a spring-biased locking pin 222. A rotation adjustment plate 220 includes locking pin holes 221 and is mounted within arm reinforcement 209. In this example, arm 201 can be rotated while the rotation adjustment plate 220 remains stationary. The arm 201 is locked into place with respect to the rotation adjustment plate 220 by locking the locking pin 222 of the arm 201 into the locking pin holes 221 of the arm adjustment plate 220. Accordingly, referring back to FIG. 11, a user may grip the gripping region 205, press the rotation adjustment lever 206 toward the gripping region 205, rotate the arm 201 to a desired position, and release the rotation adjustment lever 206 in order to adjust the angular position of the arm 201.

Still referring to FIGS. 11-13, the exercise machine 100 includes a pulley system having a plurality of pulleys, pulley housings, pulley mounts, and cables. For example, pulleys 401, 402 are secured within a pulley housing 204 of the arm 201. A pulley assembly including a pulley housing, mounts, and cables has been previously described in U.S. patent application Ser. No. 14/564,916 filed on Dec. 9, 2014, which is a continuation of U.S. patent application Ser. No. 13/633, 942 filed on Oct. 3, 2012, which is a continuation of U.S. patent application Ser. No. 13/272,355 filed on Oct. 18, 2011, which is a continuation of U.S. patent application Ser. No. 12/185,919 filed on Aug. 5, 2008, all of which are herein incorporated by reference in their entirety. It should be appreciated by one of ordinary skill in the art that the connection between the pulleys 401, 402 of the exercise machine 100 and the weight stack assembly 115 can be arranged as described in the disclosure of the above-mentioned applications herein incorporate by reference.

Referring back to FIGS. 1 and 3, the exercise machine 100 may include a removable handle unit 500 having a stopper 501 for attachment to the cables of the exercise machine 100. One of ordinary skill will appreciate that a variety of different cable attachments are known in the art, and any of those might be used with the exemplary exercise machine 100 without departing from the spirit and scope of the invention. Also, a removable chin-up and dip bar assembly 502 may be removably attached to bar receiving member 203. As illustrated in FIG. 3, the handle unit 500 and the chin-up and dip bar assembly 502 may be stored in a storage and holder unit 600 at the side of the exercise machine 100. The storage and holder unit 600 includes a storage compartment 603 for storing the handle unit 500 and the chin-up and dip bar assembly 502, a bottle holder 602, and a device holder 601. The device holder 601 may be designed for holding any number of different electronic devices such as tablets, laptops, or mobile phones.

One of skill in the art will recognize that the examples described above are not limited to any particular size, and the size of the exercise machine will depend upon the particular application and intended components. It will be appreciated by those skilled in the art that changes could be made to the examples described above without departing from the broad inventive concept thereof. It is understood, therefore, that the invention disclosed herein is not limited to the particular examples disclosed, and is intended to cover modifications within the spirit and scope of the present invention.

LIST OF REFERENCE NUMERALS

100 - exercise machine
101 - base assembly
102 - horizontal side strut
103 - support foot
104 - base plate
105 - central reinforcement strut
106 - front cross strut
107 - rear cross strut
108 - strut cover
109 - central base
110 - vertical center post
111 - weight stack housing
112 - front cover
113 - rear cover
114 - top cover
115 - weight stack assembly
200 - rotating arm assembly
201 - arm
202 - arm mounting bracket
203 - bar receiving member
204 - pulley housing
205 - gripping region
206 - rotation adjustment lever
207 - vertical adjustment lever
208 - mounting bracket clamping lever
209 - arm reinforcement
210 - horizontal linkage
213 - vertical linkage
214 - locking pin
215 - locking pin holes

LIST OF REFERENCE NUMERALS

220 - rotation adjustment plate
221 - locking pin holes
222 - spring-biased locking pin
300 - swing-away workout station
301 - bench seat
302 - stabilizing support
303 - exterior bench post
304 - interior bench post
305 - support bracket
306 - locking pin
307 - seat post
308 - base strut
309 - wheel assembly
310 - pivot adjustment mechanism
311 - mounting bracket
312 - locking pin
313 - pivot pin
314 - side strut
315 - strut cover hole
316 - front extension
320 pivot pin
321 pivot adjustment plate
322 pivot adjustment plate holes
323 locking pin
324 locking pin handle
325 pivot adjustment handle
326 handle hinge
327 locking pin plate
328 rear post extension
329 spring
500 handle unit
501 stopper
502 chin-up and dip bar assembly
600 - storage and holder unit
601 - device holder
602 - bottle holder
603 - storage compartment
3110 - first hole of mounting bracket
3120 - second hole of mounting bracket
3130 - third hole of mounting bracket
3140 - fourth hole of mounting bracket
3150 - fifth hole of mounting bracket
3160 - sixth hole of mounting bracket
3210 - first hole of adjustment plate
3220 - second hole of adjustment plate
3230 - third hole of adjustment plate The list of reference numerals is provided for convenience and is intended to aid understanding of the illustrated examples described above. The examples of the present invention may be described in many different forms and should not be construed as limited to the illustrated examples. Likewise, the list above setting forth the reference numerals and associated components comprising the illustrated examples do not limit the scope of the invention.

The invention claimed is:

1. An exercise machine, comprising:
a frame;
an arm exercise assembly that is vertically positionable on the frame; and
a workout station connected to the frame, the workout station comprising:
a seat,
a stabilizing support,
an extendable post connected to the stabilizing support, and
a pivot adjustment mechanism connected to the extendable post,
wherein the pivot adjustment mechanism pivots the extendable post forwards and backwards such that the position of the stabilizing support is configured to be adjusted forwards and backwards, and
wherein the extendable post is configured to be extended or retracted to adjust the height of the stabilizing support,
and wherein the seat is connected to the extendable post such that the seat and the extendable post pivot together as a unit when the pivot adjustment mechanism is adjusted.

2. The exercise machine of claim 1, wherein the workout station comprises a base strut and wherein the pivot adjustment mechanism is mounted onto the base strut such that the base strut supports both the seat and the stabilizing support.

3. The exercise machine of claim 2, wherein the pivot adjustment mechanism comprises:
a mounting bracket connected to the base strut, wherein the extendable post is pivotable with respect to the mounting bracket, and
a locking mechanism for holding the extendable post at various positions with respect to the mounting bracket.

4. The exercise machine of claim 1, wherein the stabilizing support is configured to rest against the user's back when the user sits on the seat facing away from the exercise machine.

5. The exercise machine of claim 1, wherein the stabilizing support is configured to rest against the user's back when the user stands facing away from the exercise machine.

6. The exercise machine of claim 1, wherein the stabilizing support is configured to rest against the user's belly when the user stands facing towards the exercise machine.

7. The exercise machine of claim 1, wherein the arm assembly comprises:
a pair of rotating arms;
an arm mounting bracket;
a vertical adjustment lever for adjusting a position of the arm assembly and arm mounting bracket with respect to the frame of the exercise machine; and
a pair of rotation adjustment levers configured to rotate each of the pair of rotating arms with respect to the arm mounting bracket.

8. An exercise machine, comprising:
a frame;
an arm exercise assembly that is vertically positionable on the frame; and
a workout station connected to the frame, the workout station comprising:
a seat,
a stabilizing support,
an extendable post connected to the stabilizing support, and
a pivot adjustment mechanism connected to the extendable post,
wherein the pivot adjustment mechanism pivots the extendable post forwards and backwards such that the position of the stabilizing support is configured to be adjusted forwards and backwards, and
wherein the extendable post is configured to be extended or retracted to adjust the height of the stabilizing support,
wherein the workout station comprises a base strut and wherein the pivot adjustment mechanism is mounted onto the base strut such that the base strut supports both the seat and the stabilizing support, wherein a front end of the base strut is supported by at least one wheel.

9. The exercise machine of claim 1, wherein the workout station is configured to be rotated from an exercise position in front of the exercise machine to a stowed position beside the exercise machine.

10. The exercise machine of claim 9, wherein the workout station further comprises a locking mechanism to secure the workout station in front of the exercise device.

11. The exercise machine of claim 10, wherein the locking mechanism comprises a pivot pin.

12. The exercise machine of claim 9, wherein the exercise position and the stowed position are 180 degrees of rotation apart from one another.

13. The exercise machine of claim 9, wherein the frame comprises:
   left and right side struts, and
   a base plate spanning between the left and right side struts, and
wherein the workout station is positioned over the base plate when in the exercise position, but is not positioned over the base plate when in the stowage position.

\* \* \* \* \*